(12) United States Patent
Hotta et al.

(10) Patent No.: US 8,089,647 B2
(45) Date of Patent: Jan. 3, 2012

(54) INFORMATION PROCESSING DEVICE AND METHOD, AND DATA COMMUNICATION SYSTEM FOR ACQUIRING DOCUMENT DATA FROM ELECTRONIC PAPER

(75) Inventors: Hiroyuki Hotta, Kanagawa (JP); Yoshitsugu Hirose, Kanagawa (JP); Yoko Ogura, Kanagawa (JP); Yasunori Saito, Kanagawa (JP); Ikutaroh Nagatsuka, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1480 days.

(21) Appl. No.: 10/965,750

(22) Filed: Oct. 18, 2004

(65) Prior Publication Data
US 2005/0207677 A1 Sep. 22, 2005

(30) Foreign Application Priority Data
Mar. 22, 2004 (JP) .................................. 2004-082162

(51) Int. Cl.
*G06F 3/12* (2006.01)
*G06F 17/00* (2006.01)

(52) U.S. Cl. .............. 358/1.15; 358/1.13; 358/1.14; 358/1.16; 358/1.17; 358/1.18; 358/1.9; 358/426.05; 358/448; 358/474; 358/523; 358/524; 382/284; 382/305; 382/306; 382/318; 715/20; 715/102; 715/273; 715/500.1; 715/526; 715/776; 345/1.1; 345/27; 345/84; 345/101; 345/162; 345/177; 345/204; 345/536; 345/547; 345/555; 271/3.01; 271/3.05; 271/3.06; 271/3.08; 271/3.09; 271/3.14; 271/3.17; 271/8.1; 271/9.02; 271/258.02; 271/257

(58) Field of Classification Search .................. 358/523, 358/524, 426.05, 1.15, 1.16, 1.17, 1.18, 1.9, 358/2.1, 3.1, 474, 1.14, 448, 447; 345/162, 345/536, 547, 555, 27, 1.1, 84, 101, 107, 345/177, 204; 382/284, 305, 306, 318; 705/76, 705/52, 14, 23, 26, 24, 406, 57; 349/2, 11, 349/78, 83, 108; 715/20, 273, 500.1, 526, 715/776
See application file for complete search history.

(56) References Cited

U.S. PATENT DOCUMENTS
5,393,147 A * 2/1995 Ueno et al. ................. 400/65
(Continued)

FOREIGN PATENT DOCUMENTS
JP A-2001-312250 11/2001
(Continued)

*Primary Examiner* — Steven Kau
(74) *Attorney, Agent, or Firm* — Oliff & Berridge, PLC

(57) ABSTRACT

An information processing device to generate data pertaining to a document from electronic paper which has a display section to display and retain the document, and a memory to store document identification data, includes a document data storage unit which stores document electronic data, a communication unit which acquires document identification data from the electronic paper, a reading unit which scans the display section, a data extraction unit which extracts from the document data storage unit document electronic data corresponding to the document identification data, a difference processing unit which extracts a note image appended on a surface of the display section according to a difference between an image from the extracted document electronic data and an image of the scanned display section, and a data generation unit which associates data of the extracted appendix image and the extracted document electronic data, thereby generates data pertaining to the document.

10 Claims, 8 Drawing Sheets

U.S. PATENT DOCUMENTS

| | | | | |
|---|---|---|---|---|
| 5,692,048 | A * | 11/1997 | Gormish et al. | 380/246 |
| 6,144,725 | A * | 11/2000 | Kurosawa et al. | 379/100.05 |
| 6,317,560 | B1 * | 11/2001 | Kawabata | 396/2 |
| 6,317,580 | B1 * | 11/2001 | Eyschen | 399/384 |
| 6,333,754 | B1 * | 12/2001 | Oba et al. | 347/112 |
| 6,496,176 | B1 * | 12/2002 | Kondoh et al. | 345/101 |
| 6,831,661 | B1 * | 12/2004 | Itoh et al. | 345/629 |
| 6,906,831 | B2 * | 6/2005 | Haining | 358/474 |
| 6,985,913 | B2 * | 1/2006 | Murata | 707/104.1 |
| 7,006,241 | B1 * | 2/2006 | Yamamoto | 358/1.15 |
| 7,154,452 | B2 * | 12/2006 | Nakamura et al. | 345/1.1 |
| 7,167,165 | B2 * | 1/2007 | Keely et al. | 345/179 |
| 7,249,324 | B2 * | 7/2007 | Nakamura et al. | 715/776 |
| 7,463,238 | B2 * | 12/2008 | Funkhouser et al. | 345/107 |
| 7,499,201 | B2 * | 3/2009 | Kodama et al. | 358/474 |
| 7,509,270 | B1 * | 3/2009 | Hendricks et al. | 705/26 |
| 2002/0111813 | A1 * | 8/2002 | Capps | 705/1 |
| 2002/0138476 | A1 * | 9/2002 | Suwa et al. | 707/3 |
| 2003/0067466 | A1 * | 4/2003 | Stephany et al. | 345/473 |
| 2004/0190080 | A1 | 9/2004 | Kodama et al. | |

FOREIGN PATENT DOCUMENTS

| | | |
|---|---|---|
| JP | A-2003-150100 | 5/2003 |
| JP | A-2003-346086 | 12/2003 |
| JP | A-2004-080601 | 3/2004 |
| JP | A-2004-222275 | 8/2004 |
| JP | A-2005-267173 | 9/2005 |
| JP | A-2005-267188 | 9/2005 |
| JP | A-2005-267219 | 9/2005 |
| JP | A-2007-033877 | 2/2007 |

* cited by examiner

FIG. 2
| DOCUMENT ID | DOCUMENT DATA |
|---|---|
| ⋮ | ⋮ |
FIG. 3A
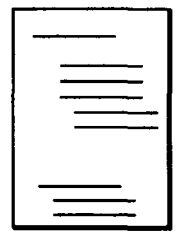
+
FIG. 3B
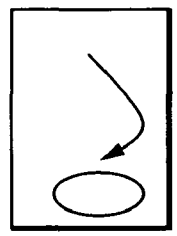
→
FIG. 3C
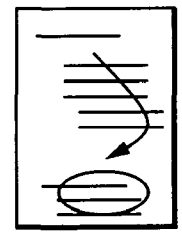
FIG. 4A
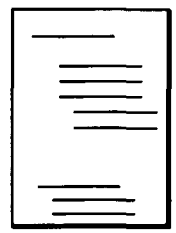
FIG. 4B
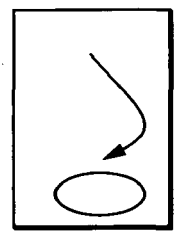
FIG. 4C
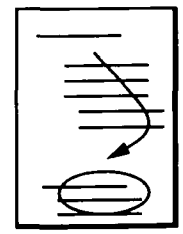

LIGHT

INFORMATION PROCESSING DEVICE AND METHOD, AND DATA COMMUNICATION SYSTEM FOR ACQUIRING DOCUMENT DATA FROM ELECTRONIC PAPER

BACKGROUND OF THE INVENTION

1. Field of the Invention

The present invention relates to an information processing device for acquiring document data from electronic paper which displays and retains a document image without power supply, and particularly to a technique which allows acquisition of data appended on the surface of the electronic paper in handwriting, or the like, by means of associating the data with the document.

2. Description of the Related Art

Documents have been created, edited, and browsed in various forms of electronic data, such as images or texts, with the use of a personal computer, or the like.

Such a document in a form of electronic data is generally displayed on a display screen of the personal computer, or printed on a sheet of paper (hereinafter called a "paper sheet"), which is one type of paper medium, so as to be browsed by a user.

In recent years, electronic paper has been developed as a medium for browsing a document, which can take the place of a paper medium. The electronic paper is capable of displaying and retaining a document image on a display section without power supply, and is paper-thin, flexible, and portable as if it were paper.

The electronic paper is a device having a display section for displaying and retaining a document image without power supply. The electronic paper can be broadly categorized, in terms of the write method by which the document image is written into the display section, into a self-write-type electronic paper which has a function of writing the document image into the display section by itself on the basis of document electronic data, and a photo-write-type electronic paper which retains a projected document image in the display section.

Such electronic paper differs from paper sheet in that the electronic paper is capable of erasing and overwriting the document image displayed and retained in the display section, and updating the document image, thereby allowing repeated reuse. Accordingly, also from the viewpoint of saving paper resources, growth in the use of the electronic paper has been desired.

Additionally, when the electronic paper is provided with a processing section having a communication function or a memory function as well as the display section, the electronic paper allows not only display and retention of the document image in the display section, but also storage of electronic data or identification data (document ID) of a document, and transmission/receipt of the data to and from the outside information processing device.

SUMMARY OF THE INVENTION

In terms of usage pattern of a document, when a document image is displayed by means of being printed on a paper sheet, a user can easily append a memo, or other information, by means of writing on the paper sheet, that is, the user can append information by means of a stress-free action. Such a note of information on the paper sheet is often taken when a document printed on paper sheet is transmitted by means of a facsimile machine. For instance, information, such as a comment of a sender, or the name of a recipient user, is appended.

As described above, electronic paper is a display storage medium having an ability to replace a paper sheet, and growth in its use has been desired. However, for instance, in the case where a document image displayed and retained in the display section is transmitted via facsimile, information appended on the surface of the display section can be read as is the case of a paper sheet. However, since the electronic paper per se differs from a paper sheet in terms of reflectivity and color tone, there may be cases where the document image displayed and retained in the display section cannot be scanned with sharpness.

The present invention has been conceived in view of the above circumstances and aims at processing in a rational manner a document image displayed and retained on the surface of a display section of electronic paper and information appended on the surface of the display section, thereby generating data pertaining to the document.

The invention also aims at implementing data communication, such as facsimile communication, with the use of electronic paper having a display section in which a document image is displayed and retained, and on whose surface appendix information is appended.

The present invention enables generation of data pertaining to a document as follows, an image reading unit scans a display section of electronic paper which displays and retains the document without power supply, a difference processing unit extracts an image of a note appended on the surface of the display section according to a difference between an image from the document electronic data and the scanned image of the display section, and a data generation unit associates data of the extracted appendix image and the document electronic data, thereby generating data pertaining to the document.

The invention provides a configuration of an information processing device which employs electronic paper, as a medium which contains contents to be transmitted, which includes a data transmission unit for transmitting, via a communication line, data pertaining to the document generated by means of the data generation unit, and appendix information appended on the surface of the display section thereof.

The invention provides a communication system in which a sender device and a receiver device conduct data communication. In the sender device, an image reading unit scans a display section of electronic paper which displays and retains a document without power supply, a difference processing unit extracts an image of a note appended on the surface of the display section, according to a difference between an image from the document electronic data and a scanned image of the display section, a data generation unit associates data of the extracted appendix image and the document electronic data, thereby generating data pertaining to the document, and a data transmission unit transmits, via a communication line, the thus-generated data pertaining to the document. In the receiver device, a data receiving unit receives, via the communication line, the data pertaining to the document, a merging unit generates merged data in which the document electronic data received as the data pertaining to the document and the note image data are merged, and an image generation unit generates merged image which is output by means of being displayed on a recording medium on the basis of the merged data.

Furthermore, in the invention, the receiver device includes a selection unit interposed between the merging unit and the image generation unit. The selection unit selects either a non-merging output or merging output. For the non-merging output, the selection unit inputs either the received document electronic data or the note image data into the image generation unit. For the merging output, the selection unit inputs the received document electronic data and the note image data into the merging unit. Accordingly, an image is output selectively among, only the document image, only the note image, or an image of the original state in which the document and the note information are merged.

According to another aspect of the invention, an information processing method includes causing an image reading unit to scan a display section of electronic paper which displays and retains a document without power supply, causing an difference processing unit to extract an image of a note appended on a surface of the display section according to a difference between an image from document electronic data and an image of the display section which is scanned, and causing a data generation unit to associate data of the image of the note which is extracted with the document electronic data, thereby to generate data pertaining to the document.

According to yet another aspect of the invention, an information processing method includes in a sender device, causing an image reading unit to scan a display section of electronic paper which displays and retains a document without power supply, causing a difference processing unit to extract an image of a note appended on a surface of the display section according to a difference between an image from document electronic data pertaining to the document and an image of the display section which is scanned, causing a data generation unit to associate data of the image of the note which is extracted with the document electronic data, thereby to generate data pertaining to the document, and causing a data transmission unit to transmit, via a communication line, the data pertaining to the document which is generated, and in a receiver device, causing a data receiving unit to receive via the communication line, the data pertaining to the document causing a merging unit to generate merged data in which the document electronic data received as data pertaining to the document and the data of the image of the note are merged, and causing an image generation unit to generate a merged image which is to be output by means of being displayed on a recording medium on basis of the merged data.

According to the present invention, a document is handled in a form of electronic data pertaining thereto, and information appended on the surface of a display section is handled as image data. Accordingly, a document image displayed and retained in the display section of electronic paper and the information appended on the surface of the display section are each rationally processed, whereby data pertaining to the document can be generated. Furthermore, through utilization of the thus-generated data pertaining to the document, data communications, such as facsimile communication, can be implemented with the use of the electronic paper, which displays and retains a document image on the surface of the display section and which includes appendix information appended on the surface of the display section. Therefore, the electronic paper can be used favorably as compared with a paper sheet.

BRIEF DESCRIPTION OF THE DRAWINGS

Preferred embodiments of the present invention will be described in detail based on the following figures, wherein:

FIG. 2 is a diagram explaining a document data configuration according to the embodiments of the invention;

FIGS. 3A to 3C are diagrams explaining a document according to the embodiments of the invention;

FIGS. 4A to 4C are diagrams explaining output modes of the document according to the embodiments of the invention;

DETAILED DESCRIPTION OF THE INVENTION

The present invention will be specifically described by reference to embodiments thereof.

First, electronic paper EP which is used in the invention as a medium for displaying and retaining document will be specifically described by reference to an example shown in FIGS. 6A to 12.

Figure 10A:
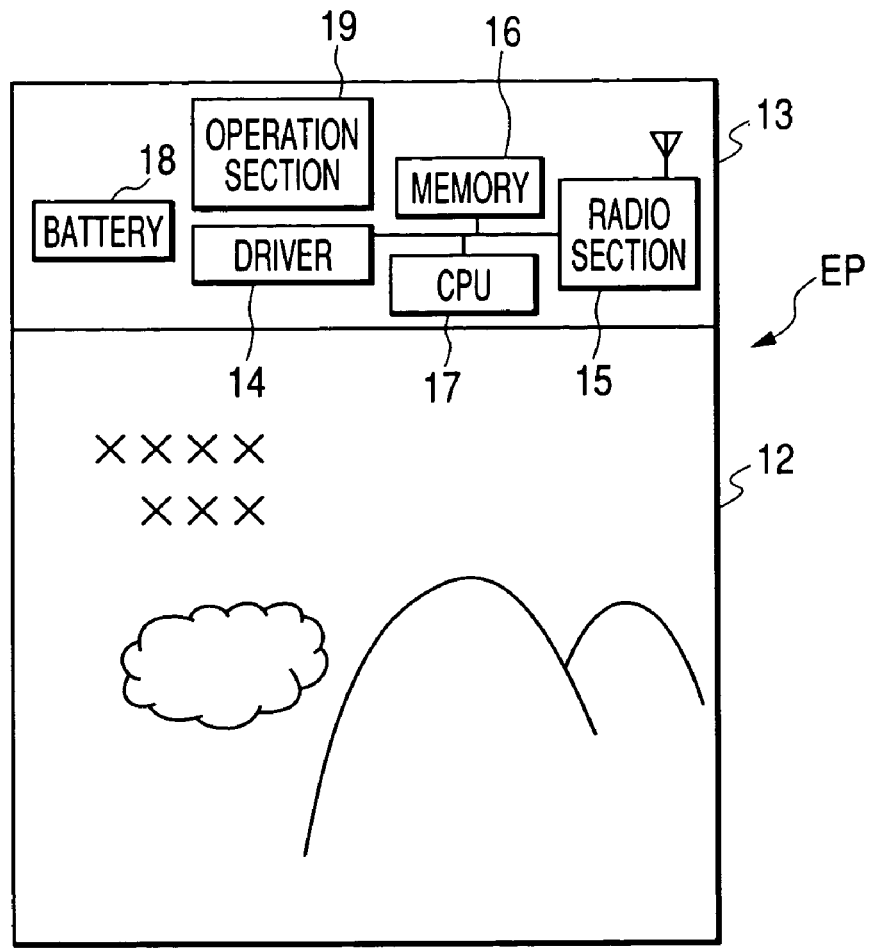
FIGS. 10A and 10B are diagrams showing an example of self-write-type electronic paper.
Figure 10B:
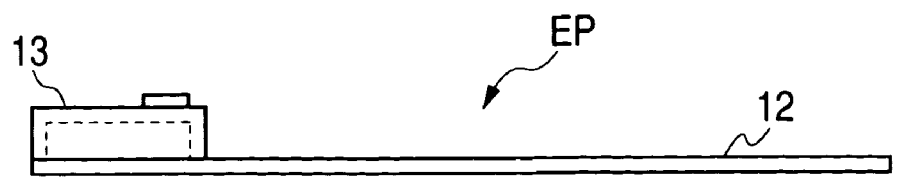
Figure 11:
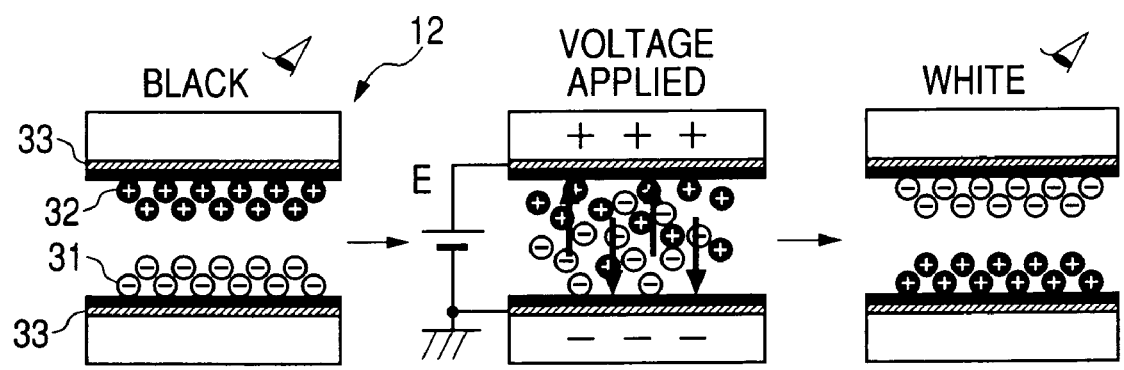
FIG. 11 is a diagram explaining operating principles of the self-write-type electronic paper.
Figure 12:
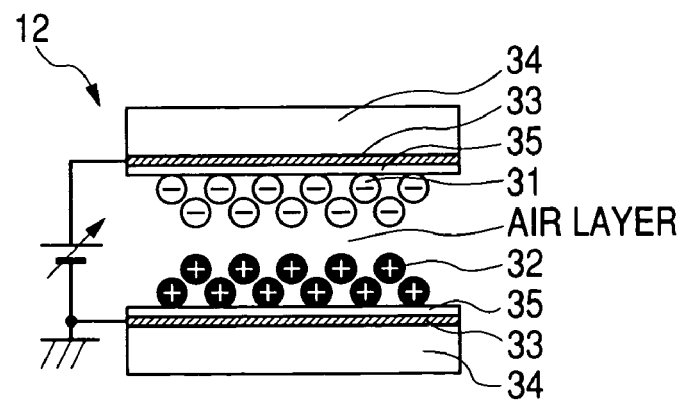
FIG. 12 is a diagram explaining a structure of the self-write-type electronic paper.

The electronic paper EP can be broadly categorized, in terms of the recording method of display information, into a photo-write type shown in FIGS. 6A to 9, and a self-write type shown in FIGS. 10 to 12. Both types are paper-like, thin and flexible devices, so-called "electronic paper."

Meanwhile, functions of the electronic paper EP may be provided in various manners depending on system mode for implementing the invention, which will be described later, from among various functions which will be described hereinafter.

Figure 6A:
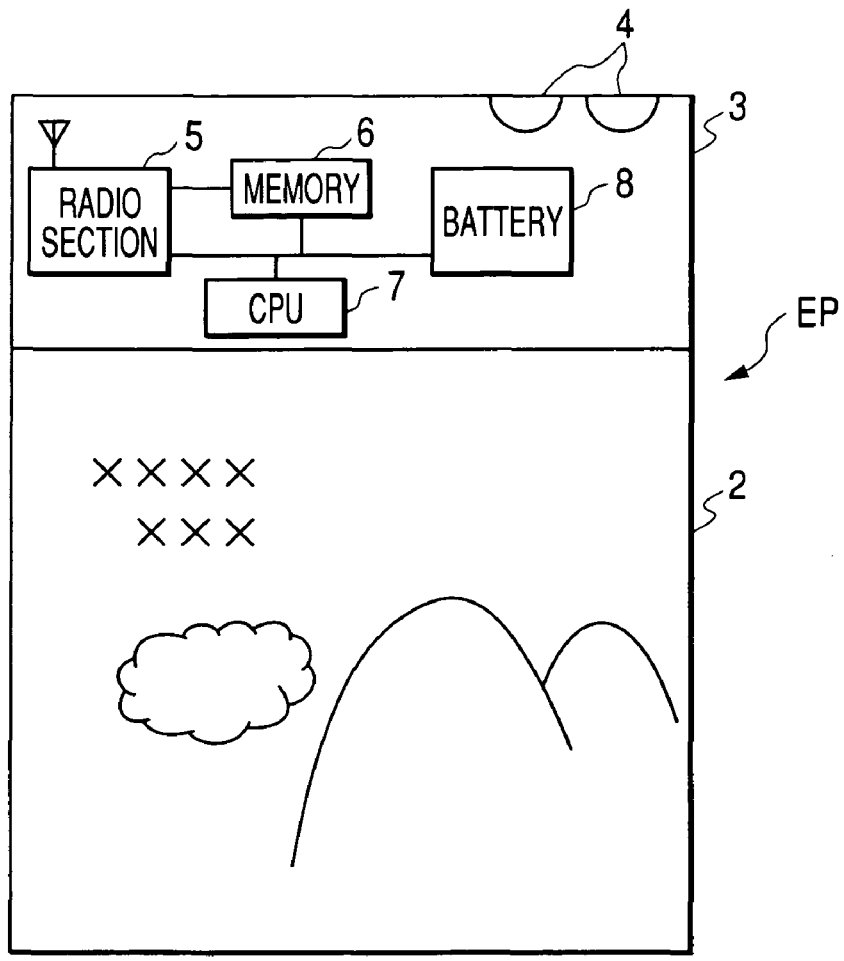
FIGS. 6A and 6B are diagrams showing an example of photo-write-type electronic paper.
Figure 6B:
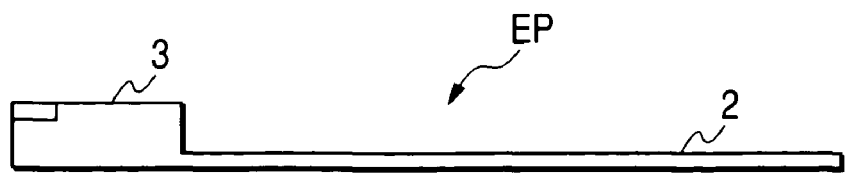

FIG. 6A shows a front view of photo-write-type electronic paper EP. FIG. 6B shows a side view of the photo-write-type electronic paper EP. The electronic paper EP shown in the drawings has a display section 2 for displaying and storing a document image, and a processing section 3 for processing electronic data. FIG. 6A also shows built-in functional sections within the processing section 3.

The photo-write-type electronic paper EP is of a size of, e.g., A-4 size paper, and is flexible and of low profile. The display section 2, which occupies most of the surface area, displays, stores, and retains the document image without power supply. The display section 2 is of arbitrary size. Further, the electronic paper EP may be configured such that, for instance, the display section 2 and the processing section 3 are detachably connected by means of attaching the processing section 3 in a clip form to the display section 2.

The processing section 3 has electrodes 4 for applying voltage to drive the display section 2, as will be described later, a communication section (in the illustrated example, a radio section) 5 for effecting data communication with the outside, a memory 6 for retaining electronic data in a readable/writable manner, a control section (CPU) 7 for effecting processing of document identification data (a document ID) or document electronic data stored in the memory 6 so as to be transmitted from/received by the radio section 5, as will be described later, and a battery 8 for supplying driving power to the functional unit.

Meanwhile, the communication section 5 may be of a type which effects data communication by means of contacting terminals, or of a type which effects optical communication with the use of infrared rays, or the like, in accordance with the system configuration to be implemented.

Figure 7:
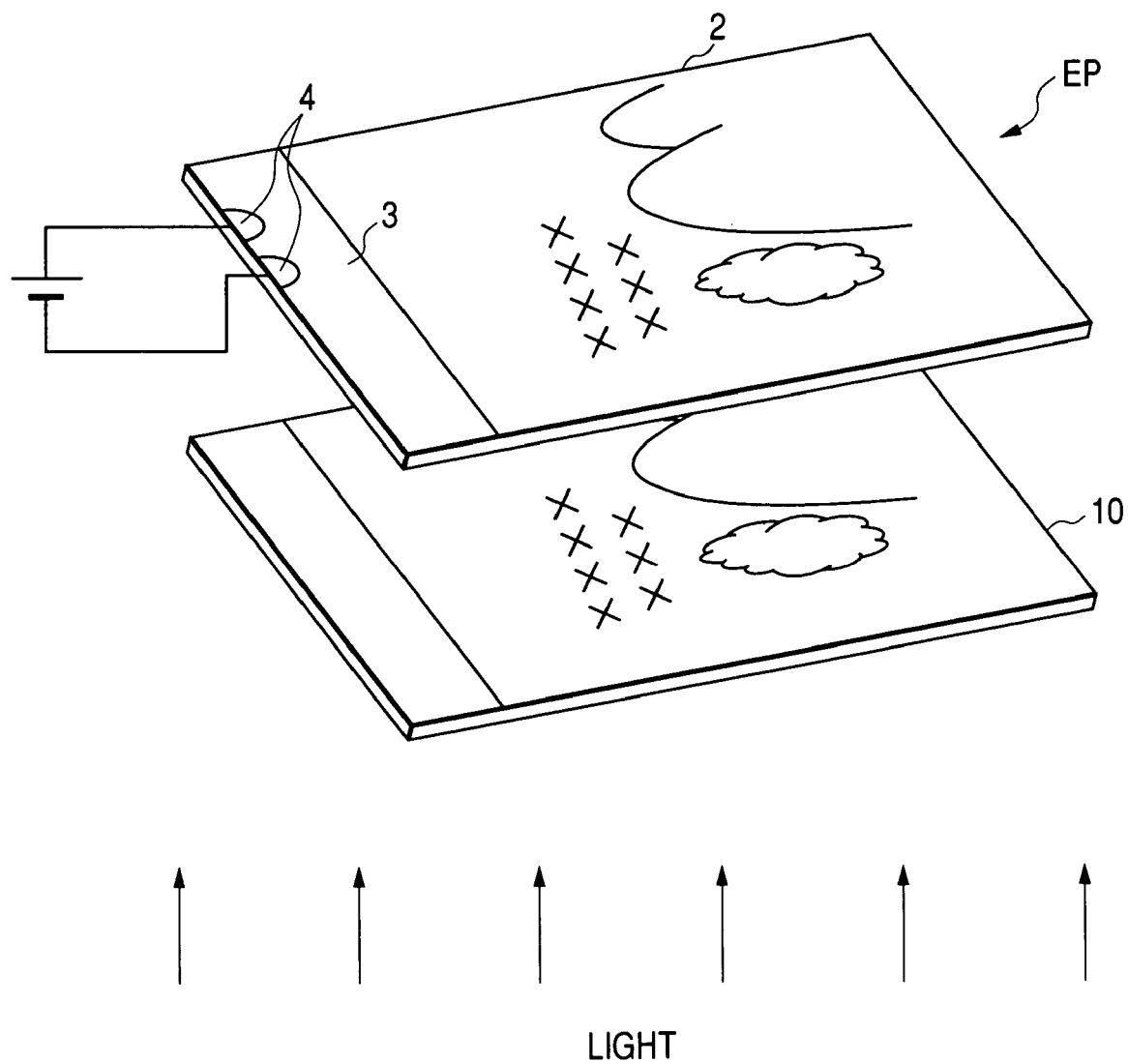
FIG. 7 is a diagram explaining how the photo-write-type electronic paper is used.

For instance, as shown in FIG. 7, the photo-write-type electronic paper EP displays a document, as an image, on a liquid crystal panel 10. Further, light is emitted on the photo-write-type electronic paper EP superposed on the liquid crystal panel 10 while voltage is applied on the electrodes 4 from the outside power source. Accordingly, the document image displayed on the liquid crystal panel 10 can be transferred onto the display section 2, and stored.

The document image can also be transferred and stored by means of emitting light on a sheet of paper, having a document printed thereon, which is superposed on the photo-write-type electronic paper EP while voltage is applied on the electrodes 4. That is, the photo-write-type electronic paper EP is capable of transferring the projected image data onto the display section 2 by means of applying voltage on the electrodes 4 and retaining the image data in the displayed state even after the voltage applied on the electrodes 4 is removed.

In terms of a cross-sectional structure of the display section 2 shown in FIG. 9, the photo-write-type electronic paper EP is configured as follows, a photoconductor layer of organic material (hereinafter referred to as "organic photoconductor layer") 20 and a layer of liquid crystal display material (a microencapsulated cholesteric liquid crystal layer) 21—which are utilized in a copier—are combined and sandwiched between a pair of transparent electrodes 22 to thereby constitute a laminated member, and the laminated member is sandwiched between a pair of transparent substrate films 23. The above configuration enables a monochrome image display on the basis of white display where the cholesteric liquid crystal layer 21 reflects light and black display where light transmitted through the liquid crystal layer 21 is absorbed in a black layer 24 interposed between the cholesteric liquid crystal layer 21 and the organic photoconductor layer 20. Furthermore, by utilizing the characteristic of a cholesteric liquid crystal that it interferes and reflects colored light in accordance with a helical pitch, a multi-color display can also be realized with a simple structure where the cholesteric liquid crystal layer 21 is configured by laminating liquid crystals having different helical pitches.

Figure 8:
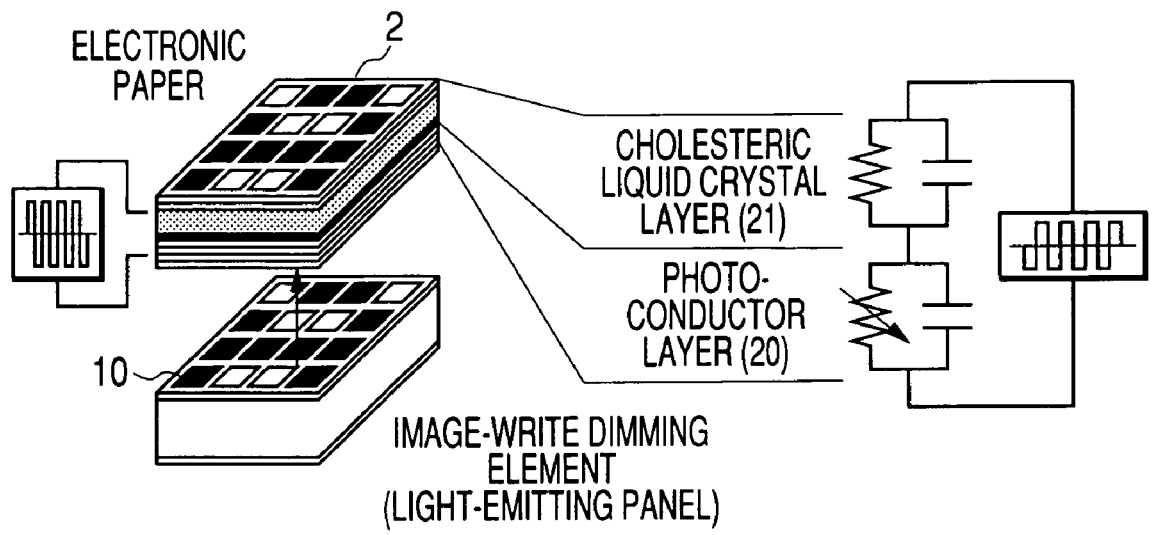
FIG. 8 is a diagram explaining operating principles of the photo-write-type electronic paper.

In terms of the operating principles of the display section 2 shown in FIG. 8, the photo-write-type electronic paper EP projects a document image to be transferred onto, e.g., an image-write dimming element panel (a light-emitting panel) 10, and when voltage is applied on the electrodes 4, the photo-write-type electronic paper EP instantaneously converts differences in light intensity into reflection density, thereby retaining the thus-projected image. The image data retained in the display section 2 can be erased by application of erasing voltage on the electrodes 4. That is, the photo-write-type electronic paper EP permits repeated reuse by repeating writing and erasing. The photo-write-type electronic paper EP can also project a new image by application of voltage on the electrodes 4 as described above, to thus overwrite the document image retained in the display section 2 without conducting the above-mentioned erasing operations. That is, the photo-write-type data storage device 1 can also be repeatedly reused by means of such an overwrite operation.

As described above, the photo-write-type electronic paper EP has a characteristic of retaining the document image transferred by means of image projection without power supply, in addition to being paper-thin and flexible. Therefore, the photo-write-type electronic paper EP is a display/recording medium which can be used with a facsimile machine, printer, or copier as if it were paper, and which, moreover, permits repeated reuse.

FIG. 10A shows a front view of a self-write-type electronic paper EP. FIG. 10B shows a side view of the self-write-type electronic paper EP. The electronic paper EP shown in the drawings has a display section 12 for displaying and recording a document image, and a processing section 13 for processing electronic data. FIG. 10A also shows built-in functional sections of the processing section 13.

The self-write-type electronic paper EP is, as is the case of the photo-write-type electronic paper EP, of a size of, e.g., A-4 size paper, and is flexible and of low profile. The processing section 13 is disposed on one portion of the display section 12 which occupies most of the surface area. As is the case of the photo-write-type electronic paper EP, the display section 12 is of arbitrary size. Further, the electronic paper EP may be configured such that, for instance, the display section 12 and the processing section 12 are detachably connected by means of attaching the processing section 13 of a clip form to the display section 12.

The processing section 13 has a driver 14 for driving the display section 12, a communication section (in the illustrated example, a radio section) 15 for effecting data communication with the outside, a memory 16 for retaining electronic data in a readable/writable manner, a control section (CPU) 17 for effecting processing of document identification data (a document ID) or document electronic data stored in the memory 16 so as to transmit/receive the same via the radio section 5, as will be described later, a battery 18 for supplying driving power to these functional units, and an operation section 19, such as a button, for receiving operation input by a user.

Meanwhile, the communication section 15 may be of a type which effects data communication by means of contacting terminals, or of a type which effects optical communication with the use of infrared rays, or the like, in accordance with the system configuration to be implemented.

Furthermore, in contrast with the photo-write-type electronic paper EP, the self-write-type electronic paper EP has the following functions, the driver 14 writes and displays a document image on the display section 12 on the basis of document electronic data retained in the memory 16, the document image to be displayed is switched/changed by means of processing by the CPU 17 in accordance with operation input from the operation section 19 or received document data, as will be described later, and the document image on the display section 12 is retained even after driving power from the driver 14 is removed.

In terms of a cross-sectional structure of the display section 12 shown in FIG. 12, the self-write-type electronic paper EP is configured as follows, fine coloring particles (in the illustrated example, white particles 31 and black particles 32) utilized as toner for a copier are sealed between a pair of electrodes 33, of which at least a surface side is transparent, to thereby form a laminated member, and the laminated member is sandwiched between a pair of film substrates 34, of which at least a surface side is transparent. The space between the electrode layers 33 is an air layer, thereby allowing free motion of the coloring particles 31, 32. Furthermore, an insulation layer 35 for inhibiting contact with the coloring particles 31, 32 is disposed on each of the electrode layers 33 of a matrix form. A multi-color display can also be realized with a simple structure by means of adopting a color filter.

In the self-write-type electronic paper EP, as shown in FIG. 11, which illustrates operating principles of the display section 12, under a state where no voltage is applied on the electrodes 33 (note that the electrodes 33 are charged in the same polarity as used in the previous driving), the negatively charged white particles 31 remain on the back side of the electronic paper EP, and the positively charged black particles 32 remain on the surface side. Accordingly, the display section 12 is black when viewed from the surface side. When the driver 14 is driven in accordance with the electronic data and reverses electrode polarities of desired portions on the matrix in accordance with image data to be displayed, contrast is reversed with regard to the white particles 31 and the black particles 32, whereby image data is displayed on the display section 12 by means of contrast between the white particles 31 and the black particles 32. By driving the driver 14 in accordance with different electronic data, image data displayed on the display section 12 by means of contrast on the white particles 31 and the black particles 32 can be switched, thereby enabling repeated reuse.

As described above, the self-write-type electronic paper EP has a characteristic of retaining image data displayed on the display section 12 without power supply, in addition to being paper-thin and flexible. That is, the self-write-type electronic paper EP is a display/recording medium which can be used as if it were paper for use with a facsimile machine, a printer, a copier, or the like.

A configuration similar to the above may be adopted, for either the photo-write type or the self-write type, such that functional sections for radio and memory, such as the radio section, the memory, and the battery, are configured as another radio IC tag separated from the display section of the electronic paper, and the radio IC tag is attached to the electronic paper. Furthermore, in the case where the radio IC tag is adopted, the battery may be a capacitor which holds electromotive force from the tag reader.

As is apparent, electronic paper of a type other than the self-write-type electronic paper and the photo-write-type electronic paper may be applied in the invention. For instance, there may be used electronic paper which is loaded on an external rewrite device and which, like the self-write-type, electronically writes contents image in the display section. In other words, the above-mentioned self-write-type electronic paper is an example of electronic paper of a type which does not require an external image write device, and the photo-write-type electronic paper is an example of electronic paper of a type which requires an external image write device.

For display section of electronic paper, there may be used liquid crystal having a memory property, such as ferroelectric liquid crystal, an electrophoretic method for switching display by means of moving charged particles, a particle rotation method for switching display by means of rotating charged particles, a magnetic migration method for switching display by means of magnetically moving particles, a thin liquid crystal driven by means of a small battery, or an electroluminescence (EL) element.

Next, a data communication system making use of the above-mentioned electronic paper EP according to an embodiment of the invention will be described.

Figure 1:
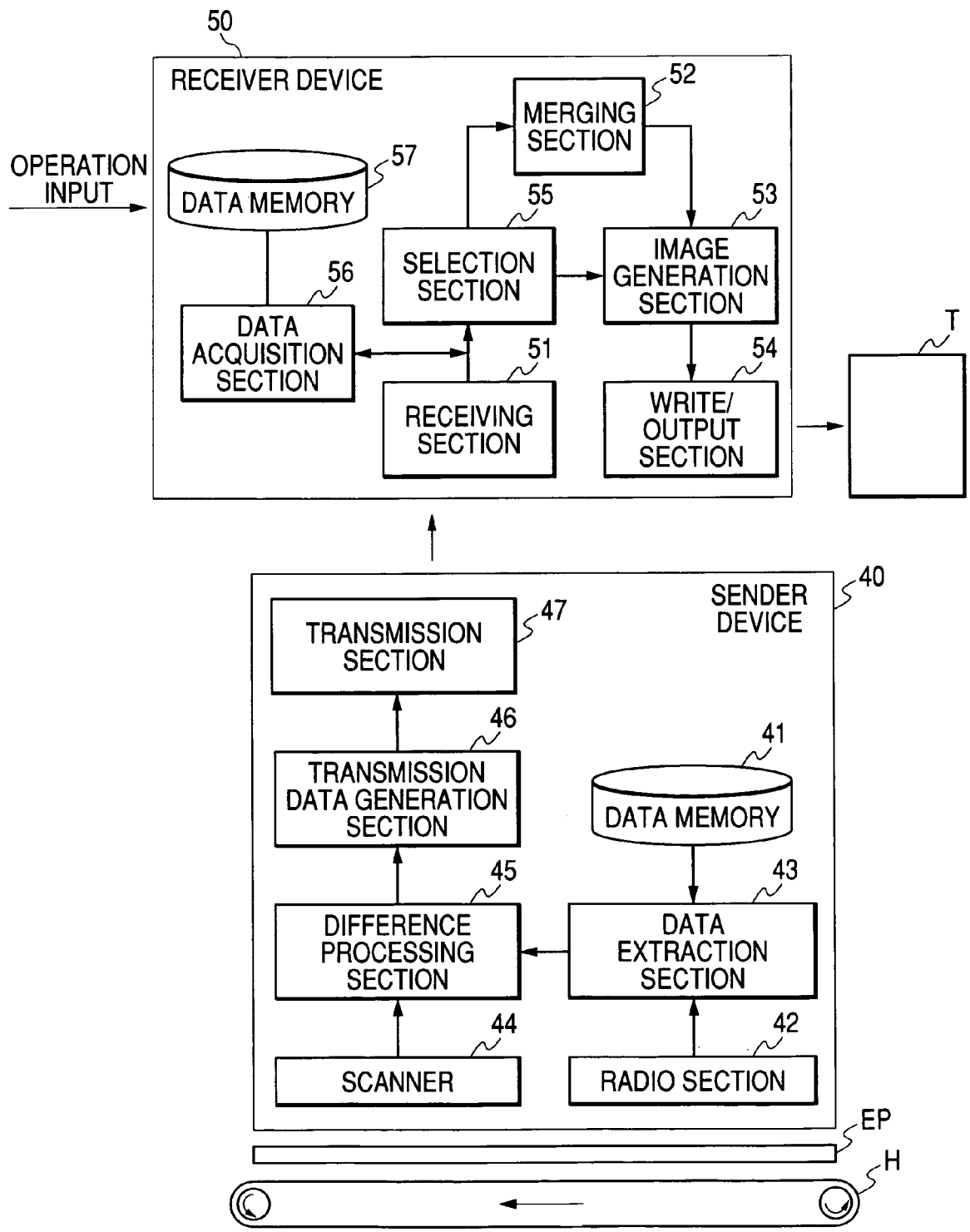
FIG. 1 is a functional configuration diagram of a data communication system according to embodiments of the present invention.

FIG. 1 shows a functional configuration of the data communication system according to the embodiment. The system includes a sender device 40 and a receiver device 50. The sender device 40 transmits, via a communication line N, data pertaining to a document which has been acquired through scanning of the electronic paper EP (i.e., data of the document and appendix). The receiver device 50 outputs a document image or appendix image on the basis of data pertaining to the document—which has been received via the communication line N—by means of displaying and storing the image in a display/recording medium T, such as electronic paper, a paper sheet, or the like. That is, the system of the embodiment constitutes a facsimile communication system with the use of the electronic paper EP.

Hereinafter, first, there will be described an embodiment in which the electronic paper EP provides the sender device 40 with a document ID for identifying the document displayed and retained in the display section 2 (12), and the sender device 40 uses the corresponding document electronic data as transmission data in accordance with the document ID. Subsequently, there will be described another embodiment in which the electronic paper EP provides the sender device 40 with electronic data pertaining to the document displayed and retained in the display section 2 (12), and the sender device 40 uses the document electronic data as transmission data.

Meanwhile, the type of the electronic paper EP is not limited to the photo-write type or the self-write type, and various types of electronic paper may be applied, so long as the electronic paper EP includes the communication function 5 (15) and memory function 6 (16) as described above.

The sender device 40 includes, as shown in FIG. 1, a data memory 41, a radio section 42, a data extraction section 43, a scanner 44, a difference processing section 45, a transmission data generation section 46, and a data transmission section 47. The data memory 41 identifies and stores the document electronic data in accordance with the document ID. The radio section 42 receives the document ID transmitted from the radio transmission section 5 (15) of the electronic paper EP. The data extraction section 43 extracts from the document data memory 41 the document electronic data which corresponds to the received document ID. The scanner reads the image from the display section 2 (12) of the electronic paper EP by means of scanning. The difference processing section 45 obtains a difference between the image based on the extracted document electronic data and the scanned image of the display section 2 (12), thereby extracting appendix image which has been appended on the surface of the display section 2 (12). The transmission data generation section 46 generates the transmission data (data pertaining to the document) by means of associating the extracted appendix image data and the extracted document electronic data. The data transmission section 47 transmits the thus-generated transmit data via the communication line.

Meanwhile, the electronic paper EP is mounted on a transport belt H disposed on the sender device 40, to thereby subjected to scanning by means of the scanner 44.

The document data memory 41 may be a data server disposed on the network, in this case, the data extraction section 43 may extract and acquire the document electronic data via the network.

The radio section 42 may be a communication unit of any of various types which effect data communication by means of contacting terminals, or which effect optical communication with the use of infrared rays, or the like.

The receiver device 50 includes a data receiving section 51, a merging section 52, an image generation section 53, and a write/output section 54. The data receiving section 51 receives the data pertaining to the document (transmission data) which has been transmitted via the communication line N. The merging section 52 generates merged data in which the document electronic data received as the data pertaining to the document and the note image data are merged. The image generation section 53 generates a merged image on the basis of the merged data. The write/output section 54 outputs the image generated by the image generation section 53 by means of displaying the image on the recording medium T, such as a paper sheet or electronic paper.

Furthermore, the receiver device 50 includes a selection section 55 connected between the merging section 52 and the image generation section 53. The selection section 55 selects, for instance, in accordance with operation by a user, either a non-merging output mode in which inputs at least one of the received document electronic data and the note image data is input into the image generation section 53, or a merging output mode in which both the received document electronic data and the note image data are input into the merging section 52.

Meanwhile, alternatively, the receiver device 50 may be configured as follows. The receiver device 50 receives the document ID instead of the document electronic data from the transmission section 47 of the sender device 40. A data acquisition section 56 acquires the document electronic data in accordance with the document ID, from a document data memory 57 disposed on the network or within the receiver device 50, thereby inputting the document electronic data into the selection section 55.

Hereinafter, data communication processing according to the system configured as described above will be described.

Meanwhile, on the display section 2 (12) of the electronic paper to be subjected to transmission processing, a document image such as shown in FIG. 3A is displayed and retained, and a note image such as shown in FIG. 3B is written on the surface of the display section 2 (12) by means of, for instance, handwriting with a pen. Accordingly, the document image and the note image are superimposed, whereby an image such as shown in FIG. 3C is displayed and retained in its entirety. The memory 6 (16) of the electronic paper EP stores the identification ID code which causes, at the time when the document image is written into the display section 2 (12), the communication section 5 (15) to receive the corresponding data, to thus cause the memory 6 (16 to display and retain the document.

In the sender device 40, when the electronic paper EP to be transmitted is fed by means of the transport belt H, the sender device 40 acquires the document ID stored in the memory 6 (16) through communication between the radio section 42 and the radio section 5 (15). Meanwhile, the communication of the document ID is effected, for instance, by means of the sender device 40 transmitting an ID request, and the control section 7 (17) of the electronic paper EP responding thereto.

When the document identification ID displayed and retained in the display section 2 (12) of the electronic paper EP is acquired as described above, the sender device 40 extracts from the document data memory 41 the document electronic data which correspond to the document ID received by the data extraction section 43.

In addition to the above-described acquisition of the document ID, in the sender device 40, the scanner 44 reads the image from the display section 2 (12) of the electronic paper EP by means of scanning.

In the sender device 40, the difference processing section 45 manipulates processing of obtaining a difference between the image based on the document electronic data extracted by means of the data extraction section 43 and the image of the display section 2 (12) scanned by the scanner 44, thereby extracting a note image (FIG. 3B) appended on the surface of the display section 2 (12).

Therefore, as a result of the difference processing, the note image data separated from the document electronic data are obtained from the image shown in FIG. 3C. The transmission data generation section 46 associates the note image data and the document electronic data, thereby generating transmission data (data pertaining to the document). The data transmission section 47 transmits the thus-generated transmission data to the receiver device 50 via the communication line N.

In the receiver device 50, the receiving section 51 receives the data pertaining to the document (transmission data) which have been transmitted via the communication line N.

In the case where the selection section 55 is set in the merging output mode, the selection section 55 inputs the received document electronic data and the note image data into the merging section 52. The merging section 52 generates merged data in which the document electronic data and the note image data are merged. The image generation section 53 generates a merged image on the basis of the merged data. The write/output section 54 outputs the thus-generated merged image by means of displaying the image on the recording medium T by means of printing, or the like.

In other words, as shown in FIG. 4C, an image identical with that displayed on the electronic paper EP to be transmitted is output by means of being displayed on the recording medium T.

In contrast, in the case where the selection section 55 is set in the non-merging output mode, the selection section 55 inputs at least one of the received document electronic data and the note image data into the image generation section 53. The image generation section 53 generates an image on the basis of the thus-input data. The write/output section 54 outputs the thus-generated image by means of displaying the image on the recording medium T by means of printing, or the like.

More specifically, in the case where the selection section 55 inputs only the document electronic data into the image generation section 53, as shown in FIG. 4A, only the document image displayed on the display section 2 (12) of the electronic paper EP to be transmitted are output by means of being displayed on the recording medium T. In the case where the selection section 55 inputs only the note image data into the image generation section 53, as shown in FIG. 4B, only the note information image displayed on the surface of the display section 2 (12) of the electronic paper EP to be transmitted are output by means of being displayed on the recording medium T.

As for an image generated either by means of merging or non-merging, the image is preferably generated, not only at the time of reception but also thereafter as occasion arises, upon selection effected by, for example ID input or selective operation.

Generally, a document image displayed and retained in the display section of the electronic paper EP is in a layer deeper than the surface of the electronic paper EP, and reflectivity and color tone differs from those of a paper sheet. Accordingly, reading a sharp image is difficult. However, when the document displayed and retained by the electronic paper EP to be transmitted is processed as electronic data, a sharp document image can be displayed and output on the receiver device 40.

Furthermore, since the receiver device 50 can output the document image and the note image separately, a sharp document—from which the note image, such as a memo, appended by the transmit user is omitted—can be received.

In the aforementioned embodiment, the electronic paper EP provides the sender device 40 with the document ID. However, in an alternative embodiment according to the invention, the electronic paper EP may provide the sender device 40 with the document electronic data displayed and retained in the display section 2 (12) so that the sender device 40 uses the document electronic data as the transmission data.

In the case of the alternative embodiment, in the functional configuration shown in FIG. 1, the data memory 41 and the data extraction section 43 can be obviated. Furthermore, the memory 6 (16) of the electronic paper EP stores the document electronic data which causes, at the time when the document image is written into the display section 2 (12), the communication section 5 (15) to receive the corresponding data, to thus cause the memory 6 (16) to display and retain the data.

In the alternative embodiment, substantially the same processing as effected in the above-mentioned embodiment is applied. However, when the electronic paper EP to be transmitted is fed by means of the transport belt H, the sender device 40 acquires the document electronic data stored in the memory 6 (16) through communication between the radio section 42 and the radio section 5 (15). The thus-acquired document electronic data and the image data scanned by the scanner 44 are input into the difference processing section 45, to thereby be subjected to difference processing. As a result of the difference processing, the note image (FIG. 3B) appended on the surface of the display section 2 (12) is extracted. The transmit data generation section 46 associates the note image data and the document electronic data, thereby generating transmission data (data pertaining to the document). The data transmission section 47 transmits the thus-generated transmission data to the receiver device 50 via the communication line N.

Processing in the receiver device 50 is completely identical with that in the aforementioned embodiment, and the recording medium T on which the image is displayed is output in a form corresponding to the merging-output mode or the non-merging output mode.

Meanwhile, when the display/recording medium is subjected to processing of image reading, upon request to miniaturize the device, there is applied a method of feeding the display/recording medium sandwiched between rollers to thus bend or fold the same, or a method of reversing the feeding direction of the display/recording medium which has been fed on the transport belt, by means of changing the direction by 90° or 180°.

Figure 9:
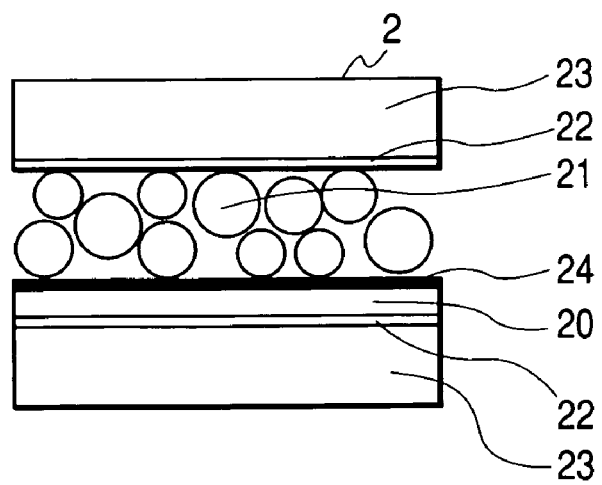
FIG. 9 is a diagram explaining a structure of the photo-write-type electronic paper.

The electronic paper EP can be flexible like a paper sheet, however, it has a cross-sectional structure as shown in FIG. 9 or 12. Accordingly, when the electronic paper EP is bent or folded as is the case of a paper sheet, there arises an apprehension that the display/retaining performance may be degraded. Particularly, in contrast with a paper sheet, the electronic paper EP can be used repeatedly. Therefore, such bending or folding is repeatedly applied.

As a countermeasure to the above problem, the transport path for the electronic paper EP in the display/recording medium in an image reading device is preferably separated from that for a paper sheet P in the display/recording medium.

Figure 5:
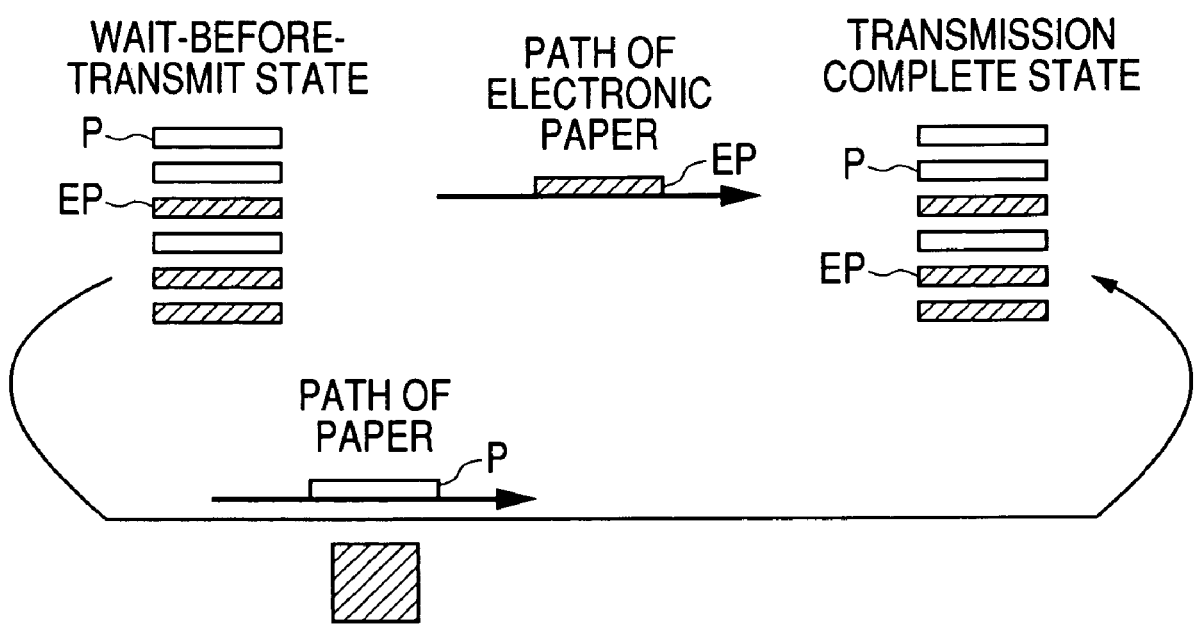
FIG. 5 is a diagram explaining a feeder of the electronic paper according to the invention.

More specifically, as shown in FIG. 5, for the paper sheet P, a normal transport feeding path in which bending is applied on paper sheet is provided, and for the electronic paper EP, another transport feeding path in which no bending is applied on the electronic paper is provided, whereby these transport paths are selectively used. The path may be selected upon operation input to the device by a user, or may be automatically selected upon discrimination of media type by means of a sensor which discriminates between the paper sheet and the electronic paper and determines characteristics thereof, such as reflectivity or thickness.

When the path is automatically selected as described above, as shown in FIG. 5, even in the case where a stack of papers in which the paper sheet P and the electronic paper EP are mixed is subjected to reading by the device, feeding is effected on the path in accordance with the media type, whereby performance degradation of the electronic paper can be prevented.

Additionally, by means of controlling and adjusting feeding of the paper sheet P and that of the electronic paper EP, the paper sheet P and the electronic paper EP which have been mixed in the stack under a wait-before-transmit state can be output while being arranged in a stack in which the paper sheet P and the electronic paper EP are respectively collected in the given order in a transmit completion state.

The entire disclosure of Japanese Patent Application No. 2004-082162 filed on Mar. 22, 2004 including specification, claims, drawings and abstract is incorporated herein by reference in its entirety.

What is claimed is:

1. An information processing system comprising:
an electronic paper; and
an information processing device that processes information from the electronic paper, wherein
the electronic paper includes:
    a display that displays document data without power supply and that allows a user to add an external note on a surface of the display;
    a memory that stores a document id of the document data to be displayed on the display; and
    a first radio section;
the information processing device includes:
    a second radio section;
    a data extraction unit that acquires the document data from a document memory based on the document id which is sent through communication between the first radio section and the second radio section;
    a first transport path that transports a paper medium;
    a second transport path that is different from the first transport path, and transports the electronic paper without applying a bend on the electronic paper;
    a scanner having a sensor that detects whether or not an object to be scanned is the electronic paper, the scanner being configured to scan the display of the electronic paper and obtain an image thereof;
    a transport path selection unit that selects the first transport path or the second transport path based upon the detection by the scanner;
    a difference processing unit that obtains a note image as a difference between an image of the document data from the memory of the information processing device and the scanned image of the display, the note image corresponding to the external note added to the surface of the display of the electronic paper; and
    a data generation unit that generates data by associating the note image and the document data.

2. The information processing system according to claim 1, the information processing device further comprising:
a transmission unit that transmits, via a communication line, the data generated by the data generation unit to outside the information processing device.

3. The information processing system according to claim 1, wherein the document data is acquired according to document identification data.

4. A data communication system comprising:
an electronic paper;
a sender device that processes information from the electronic paper; and
a receiver device, wherein
the electronic paper includes:
    a display that displays document data without power supply and that allows a user to add an external note on a surface of the display;
    a memory that stores the a document id of document data to be displayed on the display; and
    a first radio section;
the sender device includes:
    a second radio section;
    a data extraction unit that acquires the document data from a document memory based on the document id which is sent through communication between the first radio section and the second radio section;

a first transport path that transports a paper medium;

a second transport path that is different from the first transport path, and transports the electronic paper without applying a bend on the electronic paper;

a scanner having a sensor that detects whether or not an object to be scanned is the electronic paper, the scanner being configured to scan the display of the electronic paper and obtain an image thereof;

a transport path selection unit that selects the first transport path or the second transport path based upon the detection by the scanner;

a difference processing unit that obtains a note image as a difference between an image of the document data from the document memory of the information processor and the scanned image of the display, the note image corresponding to the external note added to the surface of the display of the electronic paper;

a data generation unit that generates data by associating the note image and the document data; and a transmission unit that transmits, via a communication line, the data generated by the data generation unit, the receiver device includes:

a data receiving unit that receives, via the communication line, the data sent by the transmission unit;

a merging unit that generates merged data by merging the image data of the note and the document data from the document memory, the note image and the document data from the document memory being included in the data received by the data receiving unit; and an image generation unit that generates a merged image according to the merged data, the merged image being displayed on a recording medium.

5. The data communication system according to claim 4, wherein the receiver device further includes a selection unit, which is interposed between the merging unit and the image generation unit, that selects a non-merging output in which one of the document data from the document memory and the note image is input into the image generation unit, or a merging output in which the document data from the document memory and the note image are input into the merging unit.

6. The data communication system according to claim 4, wherein the document data is acquired according to document identification data.

7. An information processing method for processing information from an electronic paper that has a display for displaying document data without power supply and that allows a user to add an external note on a surface of a display comprising:

acquiring the document data from a document memory based on a document id through communication with the electronic paper, a memory of the electronic paper has stored the document id of the document data displayed on the display of the electronic paper;

sensing whether or not an object to be scanned is the electronic paper;

selecting a first transport path or a second transport path, the first transport path configured to transport a paper medium, and the second transport path being different from the first transport path, and configured to transport the electronic paper without applying a bend on the electronic paper;

transporting the electronic paper via the second transport path when the sensor detects the object to be scanned is the electronic paper;

scanning the display of the electronic paper;

obtaining an image thereof;

obtaining a difference between an image from the document data from the document memory and the scanned image of the display, extracting a note image appended on a surface of the display; and generating data by associating the extracted note image and the document data from the document memory, wherein at least one of the above steps is performed by a processor.

8. The information processing method according to claim 7, wherein the document data is acquired according to document identification data.

9. A reading device for reading an electronic paper that has a display comprising:

a data extraction unit that acquires document data from a document memory through communication with the electronic paper, a memory of the electronic paper that has stored a document id of the document data displayed on the display of the electronic paper, a first transport path that transports a paper medium;

a second transport path that is different from the first transport path, and transports the electronic paper without applying a bend on the electronic paper;

a scanner having a sensor that detects whether or not an object to be scanned is the electronic paper, the scanner being configured to scan the display of the electronic paper and obtain an image of the display thereof;

a transport path selection unit that selects the first transport path or the second transport path based upon the detection by the scanner;

a difference processing unit that obtains a difference between an image from the document data from the memory of the electronic paper and the scanned image of the display, and extracts a note image appended on a surface of the display; and a data generation unit that generates data by associating image data of the note image and the document data from the memory of the electronic paper.

10. The reading device according to claim 9, wherein the document data is acquired according to document identification data.

* * * * *